US012659195B2

(12) United States Patent
Qi et al.

(10) Patent No.: US 12,659,195 B2
(45) Date of Patent: Jun. 16, 2026

(54) MACHINE LEARNING FOR CHANNEL ESTIMATION AGAINST DIVERSE DOPPLER EFFECTS

(71) Applicant: Nokia Solutions and Networks Oy, Espoo (FI)

(72) Inventors: Wenliang Qi, Zhejiang (CN); Wenyi Xu, Shanghai (CN); Chenhui Yi, Shanghai (CN); Jiaqi Quan, Shanghai (CN); Jakob Hoydis, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 213 days.

(21) Appl. No.: 18/286,276

(22) PCT Filed: Apr. 15, 2021

(86) PCT No.: PCT/CN2021/087592
§ 371 (c)(1),
(2) Date: Oct. 10, 2023

(87) PCT Pub. No.: WO2022/217553
PCT Pub. Date: Oct. 20, 2022

(65) Prior Publication Data
US 2024/0187285 A1     Jun. 6, 2024

(51) Int. Cl.
*H04L 25/02* (2006.01)
*H04W 64/00* (2009.01)
(52) U.S. Cl.
CPC ...... *H04L 25/0254* (2013.01); *H04L 25/0226* (2013.01); *H04W 64/006* (2013.01)
(58) Field of Classification Search
CPC ............. H04L 25/0254; H04L 25/0226; H04L 25/0224; H04L 25/0222; H04L 5/0048;
(Continued)

(56) References Cited

U.S. PATENT DOCUMENTS

2012/0207253 A1     8/2012  Park et al.
2019/0356516 A1*  11/2019  Cao ..................... H04L 25/0204
(Continued)

FOREIGN PATENT DOCUMENTS

CN          106060852 A     10/2016

OTHER PUBLICATIONS

PCT ISR, Jan. 12, 2022, 3 pages.
(Continued)

*Primary Examiner* — Dady Chery
(74) *Attorney, Agent, or Firm* — Lippes Mathias LLP

(57) ABSTRACT

Embodiments of the present disclosure relate to machine learning for channel estimation against diverse Doppler effects. In this solution, the first device receives user data in a slot from a second device via a channel between the first device and the second device, the user data includes a reference symbol. Then, the first device performs, with a NN, a first channel estimation for the channel based on information on velocity of a second device and a result of a second channel estimation for the channel. The second channel estimation is performed based on the received reference symbol. After that, the first device transmits, to the second device, an indication of a result of the first channel estimation. With this solution, channel estimation is able to be performed in diverse scenarios (e.g., diverse Doppler scenarios, high-velocity scenarios and the like) with low overheads in reference signals (e.g., 1 DMRS), thereby reducing network consumption.

19 Claims, 9 Drawing Sheets

(58) Field of Classification Search
CPC ..... H04W 64/006; G06N 3/0464; G06N 3/09;
G06N 3/096; G06N 3/08
See application file for complete search history.

(56) References Cited

U.S. PATENT DOCUMENTS

| | | | | |
|---|---|---|---|---|
| 2020/0221435 | A1 | 7/2020 | Kim | |
| 2020/0266860 | A1 | 8/2020 | Nammi | |
| 2020/0359375 | A1* | 11/2020 | Hwang | H04L 5/0055 |
| 2021/0044407 | A1* | 2/2021 | Lomayev | H04L 25/0224 |
| 2023/0342593 | A1* | 10/2023 | Sun | H04L 25/0224 |

OTHER PUBLICATIONS

PCT WR OPN, Jan. 12, 2022, 3 pages.
InterDigital Inc., "Discussions on joint channel estimation for PUSCH", R1-2100733 3GPP TSG RAN WG1 #104-E e-Meeting, Jan. 19, 2021 (Jan. 19, 2021).
Samsung, "Remaining issues on performance requirements for NR PUSCH in Rel-15", R4-1903364 3GPP tsg_ran\wg4_radio,Apr. 1, 2019 (Apr. 1, 2019).
Yang Yuwen et al. "Deep Learning-Based Channel Estimation for Doubly Selective Fading Channels", IEEE Access, v. 7, pp. 36579-36589, XP011717247, DOI: 10.1109/ACCESS.2019.2901066.
H. Huang, J. Yang, H. Huang, Y. Song and G. Gui, "Deep Learning for Super-Resolution Channel Estimation and DOA Estimation Based Massive MIMO System," in IEEE Transactions on Vehicular Technology, vol. 67, No. 9, pp. 8549-8560, Sep. 2018, doi: 10.1109/TVT.2018.2851783. 5 pgs.

* cited by examiner

100

200

500A
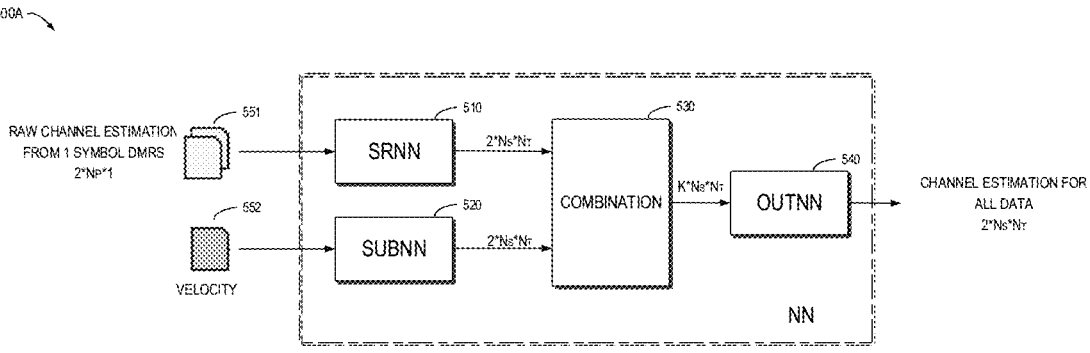
RAW CHANNEL ESTIMATION
FROM 1 SYMBOL DMRS
2*Np*1
551
510
SRNN
2*Ns*Nт
530
COMBINATION
K*Ns*Nт
540
OUTNN
CHANNEL ESTIMATION FOR
ALL DATA
2*Ns*Nт
552
520
SUBNN
2*Ns*Nт
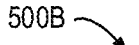
VELOCITY
NN
Fig. 5A
500B
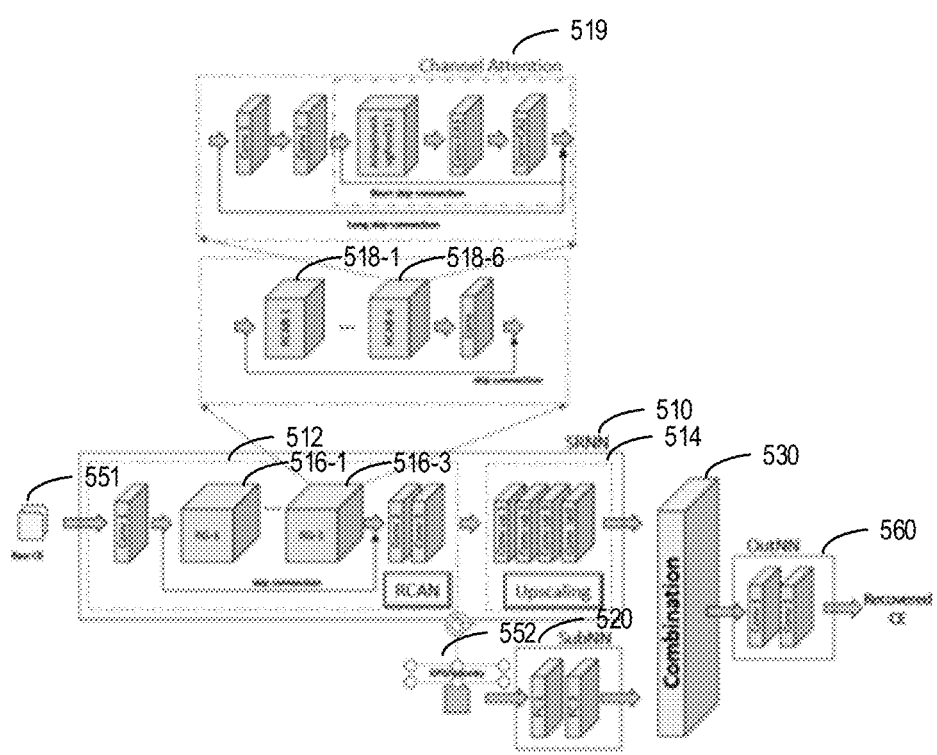
519
518-1    518-6
512
551    516-1    516-3
510
514
530
560
552    520
Fig. 5B

700

800A

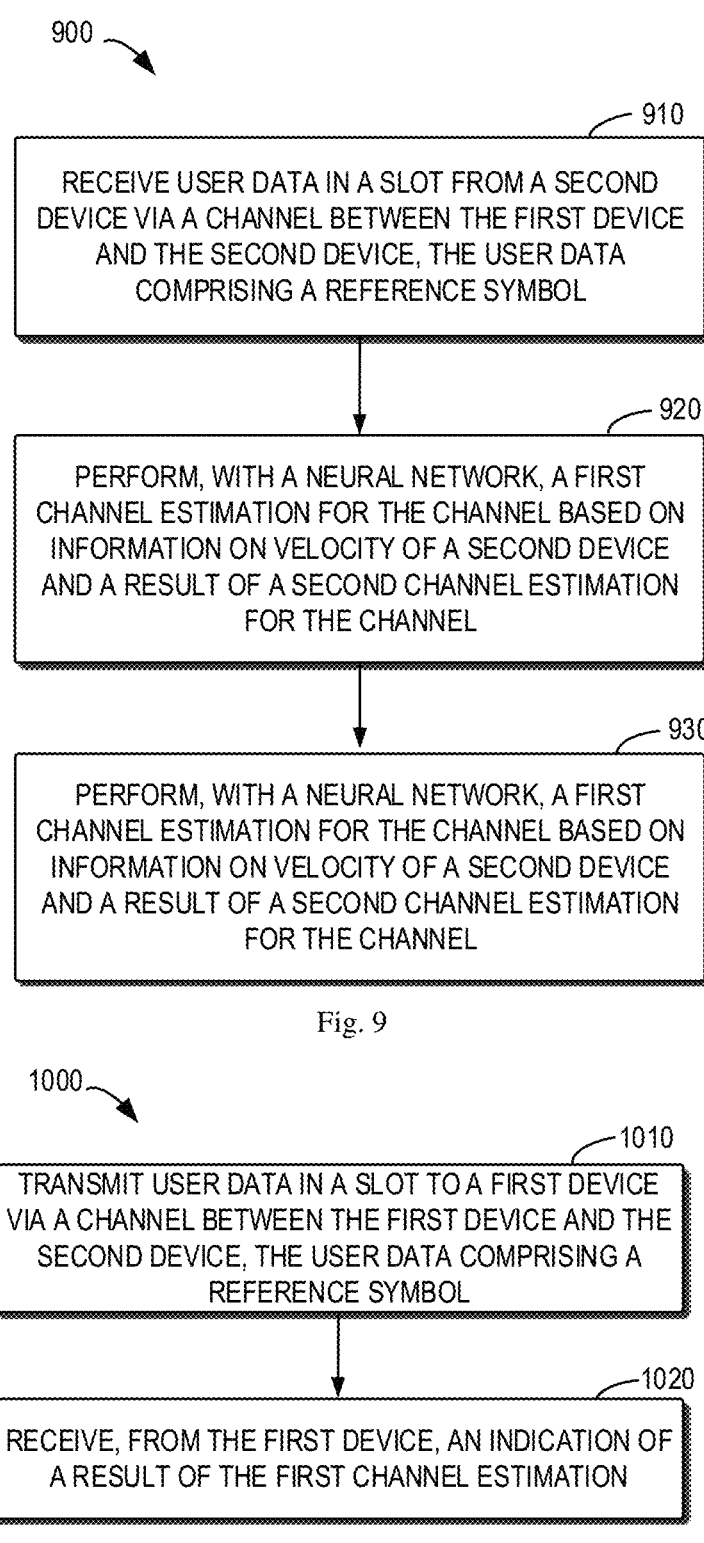

900

910

RECEIVE USER DATA IN A SLOT FROM A SECOND
DEVICE VIA A CHANNEL BETWEEN THE FIRST DEVICE
AND THE SECOND DEVICE, THE USER DATA
COMPRISING A REFERENCE SYMBOL

920

PERFORM, WITH A NEURAL NETWORK, A FIRST
CHANNEL ESTIMATION FOR THE CHANNEL BASED ON
INFORMATION ON VELOCITY OF A SECOND DEVICE
AND A RESULT OF A SECOND CHANNEL ESTIMATION
FOR THE CHANNEL

930

PERFORM, WITH A NEURAL NETWORK, A FIRST
CHANNEL ESTIMATION FOR THE CHANNEL BASED ON
INFORMATION ON VELOCITY OF A SECOND DEVICE
AND A RESULT OF A SECOND CHANNEL ESTIMATION
FOR THE CHANNEL

TRANSMIT USER DATA IN A SLOT TO A FIRST DEVICE
VIA A CHANNEL BETWEEN THE FIRST DEVICE AND THE
SECOND DEVICE, THE USER DATA COMPRISING A
REFERENCE SYMBOL

1020

RECEIVE, FROM THE FIRST DEVICE, AN INDICATION OF
A RESULT OF THE FIRST CHANNEL ESTIMATION

MACHINE LEARNING FOR CHANNEL ESTIMATION AGAINST DIVERSE DOPPLER EFFECTS

FIELD

Embodiments of the present disclosure generally relate to the field of telecommunication and in particular, to a method, a device, an apparatus and a computer readable storage medium for machine learning for channel estimation against diverse Doppler effects.

BACKGROUND

Artificial intelligence (AI)/machine learning (ML) techniques show a great potential in next generation (NG) communication. The techniques have been studied and used in communication systems, such as fault detection, failure monitoring, and the like. Especially in the past few years, AI/ML based approaches were proposed in physical (PHY) layer to optimize the PHY functions, or to address the problems that were not well solved by conventional methods. Those solutions were either through a model for a single functionality, a model for joint functionalities or an end-to-end solution.

SUMMARY

In general, example embodiments of the present disclosure provide a solution for machine learning for channel estimation against diverse Doppler effects.

In a first aspect, there is provided a first device. The first device comprises at least one processor; and at least one memory including computer program code; the at least one memory and the computer program code are configured to, with the at least one processor, cause the device to receive user data in a slot from a second device via a channel between the first device and the second device, where the user data comprises a reference symbol. Then, the first device performs, with a neural network, a first channel estimation for the channel based on information on velocity of a second device and a result of a second channel estimation for the channel, where the second channel estimation is performed based on the received reference symbol. After that, the first device transmits, to the second device, an indication of a result of the first channel estimation.

In a second aspect, there is provided a second device. The second device comprises at least one processor; and at least one memory including computer program code; the at least one memory and the computer program code are configured to, with the at least one processor, cause the device to transmit user data in a slot to a first device via a channel between the first device and the second device, where the user data comprises a reference symbol, such that the first device performs, with a neural network, a first channel estimation for the channel based on information on velocity of the second device and a result of a second channel estimation for the channel, the second channel estimation being performed based on the received reference symbol; receive, from the first device, an indication of a result of the first channel estimation.

In a third aspect, there is provided a method. The method comprises receiving, at a first device from a second device, user data in a slot from a second device via a channel between the first device and the second device, the user data comprising a reference symbol; performing, with a neural network, a first channel estimation for the channel based on information on velocity of a second device and a result of a second channel estimation for the channel, the second channel estimation being performed based on the received reference symbol; and transmitting, to the second device, an indication of a result of the first channel estimation.

In a fourth aspect, there is provided a method. The method comprises: transmitting, at a second device to a first device, user data in a slot to a first device via a channel between the first device and the second device, the user data comprising a reference symbol, such that the first device performs, with a neural network, a first channel estimation for the channel based on information on velocity of the second device and a result of a second channel estimation for the channel, the second channel estimation being performed based on the received reference symbol; and receiving, from the first device, an indication of a result of the first channel estimation.

In a fifth aspect, there is provided a first apparatus. The first apparatus comprises means for receiving, from a second apparatus, user data in a slot from a second apparatus via a channel between the first apparatus and the second apparatus, the user data comprising a reference symbol; means for performing, with a neural network, a first channel estimation for the channel based on information on velocity of a second apparatus and a result of a second channel estimation for the channel, the second channel estimation being performed based on the received reference symbol; and means for transmitting, to the second apparatus, an indication of a result of the first channel estimation.

In a sixth aspect, there is provided a second apparatus. The second apparatus comprises means for transmitting, at a second apparatus to a first apparatus, user data in a slot to a first apparatus via a channel between the first apparatus and the second apparatus, the user data comprising a reference symbol, such that the first apparatus performs, with a neural network, a first channel estimation for the channel based on information on velocity of the second apparatus and a result of a second channel estimation for the channel, the second channel estimation being performed based on the received reference symbol; and means for receiving, from the first apparatus, an indication of a result of the first channel estimation.

In a seventh aspect, there is provided a computer-readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIGS. 5A-5B illustrate example structures of neural network (NN) according to some example embodiments of the present disclosure;

FIG. 9 illustrates a flowchart of a method implemented at the first device according to some embodiments of the present disclosure;

FIG. 10 illustrates a flowchart of a method implemented at the second device according to some embodiments of the present disclosure;

Throughout the drawings, the same or similar reference numerals represent the same or similar element.

DETAILED DESCRIPTION

Figure 1:
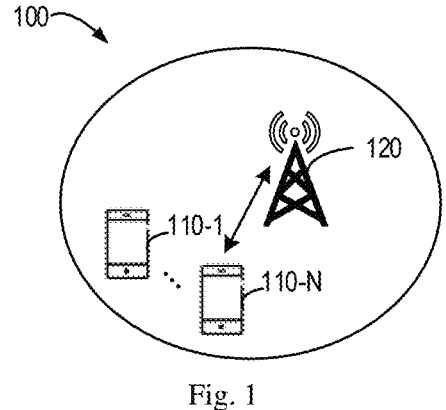
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), an integrated access and backhaul (IAB) node, a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

FIG. 1 illustrates an example communication environment 100 in which example embodiments of the present disclosure can be implemented. The communication environment 100, which may be a part of a communication network, includes a first device 110 (may also be referred to as network device) and a group of second devices 120-1 . . . 120-N (where N represents any suitable positive integer) (may also be referred to as terminal device). For the purpose of discussion, the second devices 120-1 . . . 120-N will be collectively or individually referred to as second device 120.

The communications between the first devices 110 and the second device 120 and between the first devices 110 via the second device 120 may follow any suitable communication standards or protocols, which are already in existence or to be developed in the future, such as universal mobile telecommunications system (UMTS), long term evolution (LTE), LTE-advanced (LTE-A), the fifth generation (5G) new radio (NR), wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), bluetooth, ZigBee, and machine type communication (MTC), enhanced mobile broadband (eMBB), massive machine type communication (mMTC), ultra-reliable low latency communication (URLLC), carrier aggregation (CA), dual connection (DC), and new radio unlicensed (NR-U) technologies.

Channel estimation is a challenging problem in wireless communications. Transmitted signals are typically reflected and scattered, arriving at the receiver along multiple paths. When these paths have similar delays, they add either constructively or destructively, giving rise to fading. When these paths have very different delays, they appear as signal echoes. Due to the mobility of the transmitter, the receiver, or the scattering objects, the channel changes over time.

Further, mobility of a second device 120 (e.g., UE) is one of the important contributors to the Doppler frequency offset, which could be modelled by the following equation (1) in received signals after transformation into frequency domain:

$$e^{j2\pi N_{0,i}^{gap} \cdot T_s \cdot \delta f} \cdot FFT\left(y_i(n) \cdot e^{j2\pi n \cdot T_s \cdot \delta f}\right) n = 0, 1, \ldots, N_{FFT} - 1 \quad (1)$$

where, $\delta f$ represents the function of velocity, $T_s$ is basic time unit, and $$N_{0,i}^{gap}$$

is the number of samples between OFDM symbol i and OFDM symbol 0, $$e^{j2\pi N_{0,i}^{gap} \cdot T_s \cdot \delta f}$$

donates the inter OFDM phase rotation between slot header and OFDM symbol i, $e^{j2\pi n \cdot T_s \cdot \delta f}$ represents the inner OFDM phase rotation, $y_i(n)$ represents the received signals, FFT( ) represents performing the Fourier transformation, and $N_{FFT}$ represents FFT size.

As such, besides the interference between sub-carriers within one OFDM symbol, a phase rotation exists between different OFDM symbols. In non-line-of-sight scenarios, Sf would be more complicated since multi-path transmission in a complicated wireless environment is very implicit to understand and challenging to compensate.

Figure 2:
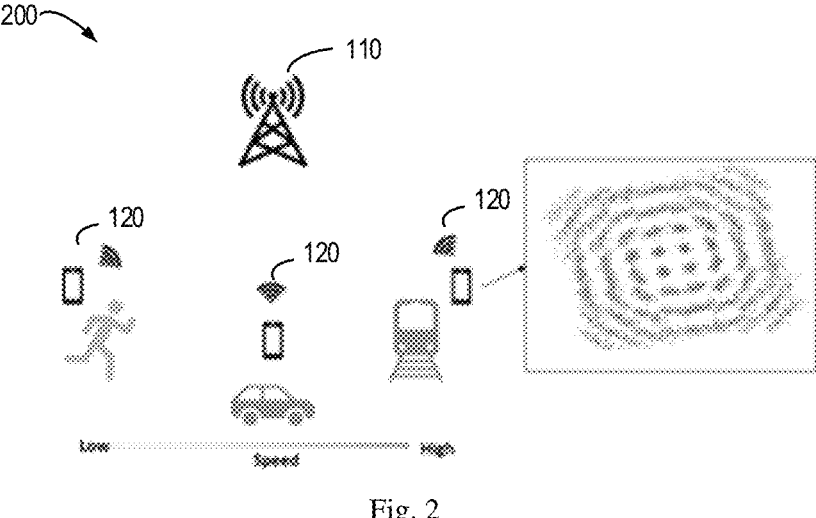
FIG. 2 illustrates a constellation diagram rotation in high Doppler scenario.

Thus, when the second device 120 (e.g., UE) is moving at high speed and the Doppler effects is not ignorable, channel estimation will be failed with only 1 demodulation reference signal (DMRS) due to the unknown inter OFDM symbol phase rotation. FIG. 2 illustrates a constellation diagram rotation in high Doppler scenario 200 when the second device 120 (e.g., a vehicle or a train in operation and the like) is moving at high speed.

In order to overcome the complicated phase rotation, two or more DMRSs are used to compensate the undesired Doppler effects by estimating the phase rotation between OFDM symbols in conventional solutions. However, conventional solutions hold a subjective assumption of linear change in interpolation which is not suitable especially in high-velocity scenarios. On top of that, multiple DMRSs sacrifice the transmission efficiency in practice.

Moreover, as mentioned above, AI/ML techniques show a great potential in next generation (NG) communication. The techniques have been studied and used in communication systems, such as fault detection, failure monitoring, etc. Especially in the past few years, AI/ML based approaches were proposed in PHY layer to optimize the PHY functions, or to address the problems that were not well solved by conventional methods. Those solutions were either through a model for a single functionality, a model for joint functionalities or an end-to-end solution, including various topics like channel coding/decoding, channel state information feedback, modulation recognition and constellation learning, and the like. AI/ML techniques could save many efforts to provide different "customized" solutions with one model to address specified problems. One topic in PHY layer is the channel estimation that could customize the algorithm itself to adapt to various conditions.

In order to solve at least part of the above-mentioned problems, a solution for machine learning for channel estimation against diverse Doppler effects is provided. In this solution, the first device 110 receives user data in a slot from a second device 120 via a channel between the first device 110 and the second device 120. The user data includes a reference symbol (e.g., a DMRS). Then the first device 110 performs, with a NN, channel estimation (may also be referred to the first channel estimation) for the channel based on information on velocity of a second device 120 and a result of a raw channel estimation (may also be referred to the second channel estimation) for the channel. The raw channel estimation is performed based on the received reference symbol. After that, the first device 110 transmits, to the second device 120, an indication of a result of the first channel estimation.

As such, a channel estimation approach is provided based on downlink techniques (e.g., channel estimation). With this approach, channel estimation is able to be performed in diverse scenarios (e.g., diver Doppler scenarios, high-velocity scenarios and the like) with low overheads in reference signals (e.g., 1 DMRS), thereby reducing network consumption. Further, the above solution provides restoration of channel estimation has on linear change assumption, thereby resulting in accurate interpolation.

Figures 3, 4:
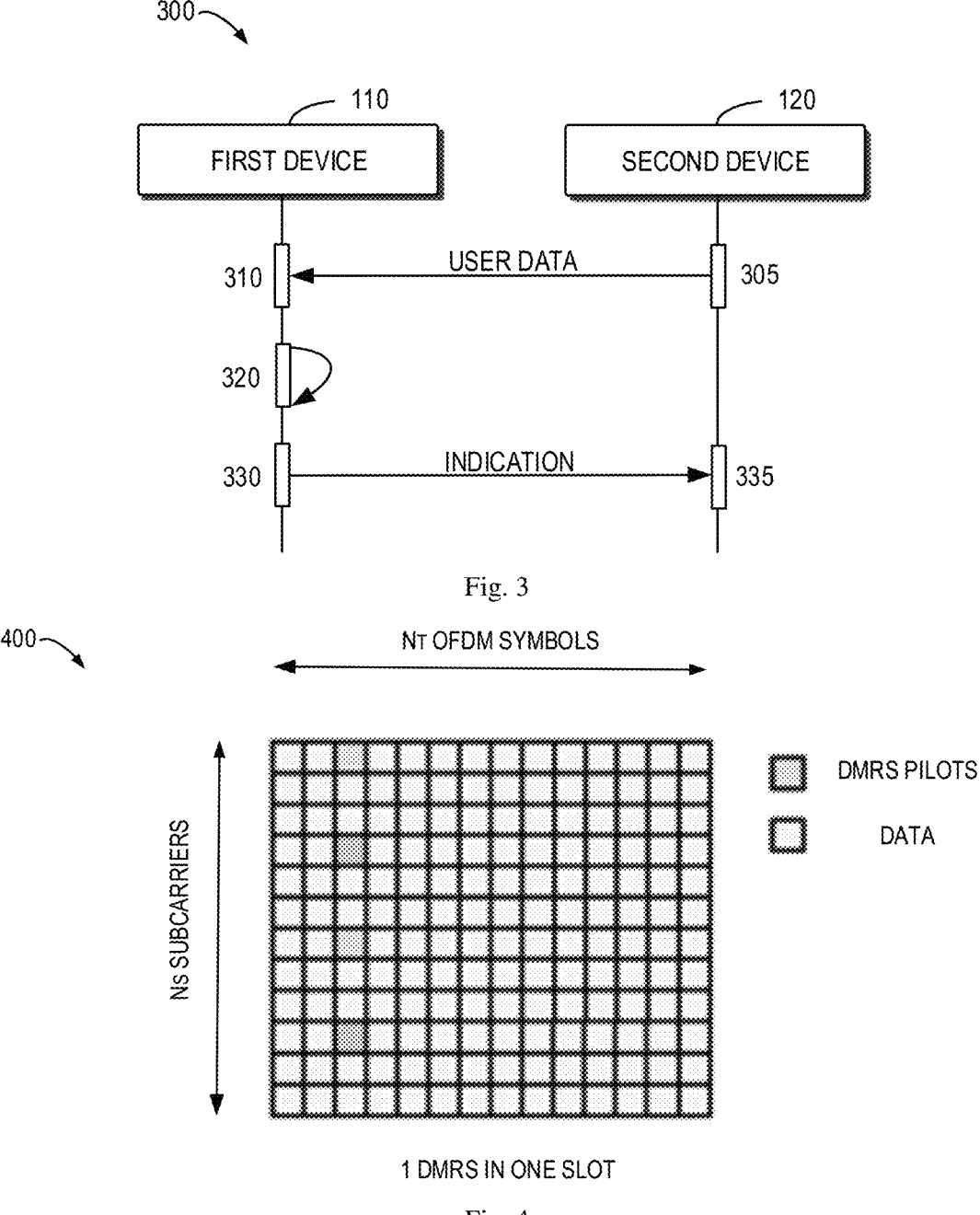
FIG. 3 illustrates a signaling flow for channel estimation according to some example embodiments of the present disclosure.
FIG. 4 illustrates an example user data in one slot according to some example embodiments of the present disclosure.

Example embodiments of the present disclosure will be described in detail below with reference to the accompanying drawings 3-7. Reference is now made to FIG. 3, which shows a signaling flow 300 for channel estimation according to some example embodiments of the present disclosure. For the purpose of discussion, the signaling flow 300 will be described with reference to FIG. 1. The signaling flow 300 involves the first device 110 and the second device 120 as illustrated in FIG. 1.

As shown in the signaling flow 300, the second device 120 transmits 305 user data in a slot to the first device 110 via a channel between the first device 110 and the second device 120. The user data includes a reference symbol. In some examples, the channel may be a wireless channel.

In some embodiments, the user data may include one DMRS in one slot. For example, FIG. 4 illustrates an example user data 400 in one slot according to some example embodiments of the present disclosure. It should be appreciated that the user data 400 in one slot in FIG. 4 is shown only for the purpose of illustration and the scope of the present application is not limited in this regard.

As shown in FIG. 4, the user data 400 may include resource elements in a frequency-time grid slot. Among the resource elements, some of them are reference signals (i.e., DMRS pilots) and the rest is data. Specifically, as shown in FIG. 4, there may be $N_t$ (e.g., 14) symbols (e.g., OFDM symbols) in time domain and $N_s$ (e.g., 12) subcarriers in frequency domain. Both the $N_t$ and $N_s$ may be positive integers. Accordingly, there are $N_s$ (e.g., 12) resource elements in each symbol. Further, there are $N_p$ (e.g., 4) resource elements for DMRS pilots in one symbol and $N_d$ (e.g., 8) resource elements for data in the DMRS. Both the $N_p$ and $N_d$ may be positive integers.

It should be appreciated that, other than the numbers shown in FIG. 4, the user data 400 in one slot may also include other numbers of symbols, subcarriers, or DMRS pilots, and the scope of the present disclosure is not limited in this regard.

Now returning to FIG. 3, accordingly, the first device 110 receives 310 the user data in the slot from the second device 120 via the channel. Then the first device 110 performs 320, with a NN, a first channel estimation for the channel based on information on velocity of a second device 120 and a result of a raw channel estimation for the channel. The raw channel estimation is performed based on the received reference symbol. In one example, the output of the first channel estimation may be for all data in the user data. More details example for the output of the first channel estimation will be provided in a latter part with reference to FIG. 5A.

In some embodiments, the information on velocity may be a recent information.

In some embodiments, the information on velocity may include the moving speed of the second device 120. In such embodiments, for example, the information on velocity may be 60 kilometer/hour (km/h) and the like. In another example, the information on velocity (e.g., the moving speed of the second device 120) may be vectors of information on velocity including the directions (i.e., the information on velocity is directional). Accordingly, for example, the information on velocity may be $$\left[30\cos\left(\frac{\pi}{4}\right), 30\sin\left(\frac{\pi}{4}\right), 0\right] \text{km/hour}$$

in three directions (e.g., along x, y and z axises).

In some other embodiments, the information on velocity may include information on position of the second device 120. In such embodiments, the information may different positions of the second device 120 which may be obtained through the global positioning system (GPS) or other systems. With such information, the first device 110 may deduct information on velocity of the second device 120. For example, the first device 110 may predict the moving speed of the second device 120 based on the positions of the second device 120 where it locates at different time points. It should be appreciated that ways on how to calculate the information on velocity of the second device 120 based on the information on position of the second device 120 may vary and the scope of the present disclosure is not limited in this regard.

In some embodiments, the first device 110 may transmit, to the second device 120, a message to notify the second device 120 to transmit the information on velocity. In such embodiments, for example, the message may be sent in a broadcasting way via a dedicated message. For example, the message may be a system information block (SIB) message which include the information on the notification of the second device 120 to transmit the information on velocity. The message may also be other kinds of existing messages in 3GPP standard or may also be a new message transmitted separately the scope of the present disclosure is not limited in this regard.

Upon receiving the message, the second device 120 may transmit the information on the velocity to the first device 110. Accordingly, the first device 110 may receive the information on velocity directly from the first device.

In some other embodiments, the first device 110 may also obtain the information on velocity from other devices (e.g., a GPS platform/server and the like) and the protection scope of the present disclosure is not limited in this regard.

In some embodiments, the NN may include a super resolution NN (SRNN), and a further NN. The further NN may also be referred to as a Sub-neural network (SubNN) in the present disclosure. In such embodiments, the result of the raw channel estimation may be inputted to the SRNN and the information on velocity may be inputted to the further NN. The neural work according to such embodiments will be introduced in detail in FIG. 5. In some other embodiments, the NN may also include other kinds of NNs and the protection scope of the present disclosure is not limited in this regard.

Now returning to FIG. 3, as shown in FIG. 3, the first device 110 then transmits 330, to the second device 120, an indication of a result of the first channel estimation, and accordingly the second device 120 receives 335 the indication. In some embodiments, the second device 120 may perform other actions based on the induction, the details of which will be illustrated in a latter part with reference to FIGS. 6 and 7, respectively.

FIGS. 5A-5B illustrate example structures of the NN according to some example embodiments of the present disclosure. It should be appreciated that the NN 500A and 500B in FIGS. 5A-5B are shown only for the purpose of illustration rather than limiting the scope of the present disclosure.

FIG. 5A illustrates a structure of NN 500A according to some example embodiments of the present disclosure. The NN shown in FIG. 5 may also be referred to as a sub-residue channel attention network (SubRCAN). As shown in FIG. 5A, in some embodiments, the NN 500A may include a SRNN 510, a SubNN 520, a combination module 530 and an output neural network (OutNN) 540, the details of which will be described in the following part.

In some examples, the SRNN 510 may take main responsibility for restoring the channel estimation in frequency domain. It may restore high resolution channel estimation from low resolution raw channel estimation (i.e., the second channel estimation) from DMRS pilots. In one example, the SRNN 510 may include a residue channel attention network (RCAN), the details of which will be illustrated in FIG. 5B in a latter part.

In such example, the input of the SRNN 510 may be a raw channel estimation from 1 symbol DMRS. An example of the input may be $2*N_p*1$ matrices, where the input is split to real and imaginary parts with $N_p$ DMRS pilots in one symbol, that is, two Np*1 matrices. Accordingly, the output of the SRNN 510 may be $2*N_s*N_t$ matrices after the upscaling.

In other examples, the SRNN 510 may also be other types of SRNN, for example, a super resolution convolution neural network (SRCNN), convolutional neural network (CNN) and the like, and the scope of the present disclosure is not limited in this regard.

In some examples, the SubNN 520 may be used to assist SRNN 510 to handle high Doppler scenarios by extracting the inter OFDM symbol differences and to well restore the channel estimation with fewer DMRS (e.g., 1 DMRS) than in conventional solution. The input of SubNN 520 may be vectors of information on velocity including the directions.

Accordingly, the SubNN 520 may extract low dimensional features from the information on velocity which could represent the channel characters (might not be human-intuitive) and may later be merged with the output of the above SRNN 510 to compensate Doppler induced constellation degradation in time domain.

In one example, the SubNN 520 may have only two or three fully connected layers with a maximum output length of $2*1*N_t$. Then it may be repeated to have the same dimension of $2*N_s*N_t$ as SRNN 510. The SubNN 520 plays a key in learning the inter-symbol differences and correcting the phase rotation, as shown by the constellation diagram in FIG. 2 in the previous part. Moreover, the nearly linear mapping also favours fast training to capture the Doppler influences.

In some embodiments, the outputs of the SRNN 510 and SubNN 520 are inputted into the combination module 530. In one example, the combination module 530 may be either a catenation operation. In another example, the combination module 530 may also be a direct element wise production. The combination module 530 may also be in other forms (e.g., cascading the two matrixes of the output from SRNN 510 and SubNN 520) and the protection scope of the present application is not limited in this regard.

In some embodiments, the result from the combination module 530 may be further inputted to the OutNN 540 with further optimization. Then, recovered channel estimation (i.e., first channel estimation) in one slot may be outputted. The output may be $2*N_s*N_t$, which is an channel estimation for all data).

The NN 500A described above is fast in convergence and low demands on training data, thereby saving processing resource of the first device 110 and network resources. Channel estimation is able to be performed with NN 500A in high-Doppler scenarios with fewer reference signals (e.g., 1 DMRS).

FIG. 5B illustrates a more detailed structure of a NN (e.g., a SubRCAN) 500B according to some example embodiments of the present disclosure. As shown in FIG. 5B, the NN 500B may include a SRNN 510, a SubNN 520, a combination module 530 and an OutNN 540 described in FIG. 5A. As show in FIG. 5B, raw channel estimation 551 and information velocity (i.e., GPS/velocity shown in FIG. 5B) 552 are inputted to the SRNN 510, a SubNN 520, respectively.

In some embodiments, the SRNN 510 may include an RCAN 512 and an upscaling network 514, as shown in FIG. 5B. The RCAN 512 is fast in converging and has high accuracy in restoration work. RCAN 512 may have a residue in residue structure, including, for example, residual groups RGs (e.g., RG-1 516-1 . . . RG3 516-3, which may be individually or collectively referred to as RG(s) 516) as shown in FIG. 5, thereby helping in relieving the training difficulties.

The above NN (e.g., NN 500A) provides restoration of channel estimation has on linear change assumption, thereby bringing accurate interpolation. Further, NN such as SubRCAN is fast in convergence and low demands on training data, thereby saving processing resource of the first device 110 and the network consumption.

In some examples, as shown in FIG. 5B, each of the RG 516 may include residual channel attention blocks (RCABs), for example RCAB-1 518-1 . . . RCAB-6 518-6, which may be individually or collectively referred to as RCAB 518. The RCAB 518 may include channel attention mechanism (e.g. using a channel attention function 519), thus making the NN 500B focus on more informative features.

It should be appreciated that some of the modules shown in FIG. 5B may be skipped, and additional module may be added and the scope of the present disclosure is not limited in this regard.

As shown in FIG. 5B, in some example, the SubNN 520 may have two fully connected (FC) layers. Furthermore, the OutNN 560 may include two convolution layers. However, it should be appreciated that the number of layers in the SubNN 520 and OutNN 560 may be other numbers and the scope of the present disclosure is not limited in this regard.

Figure 5C:
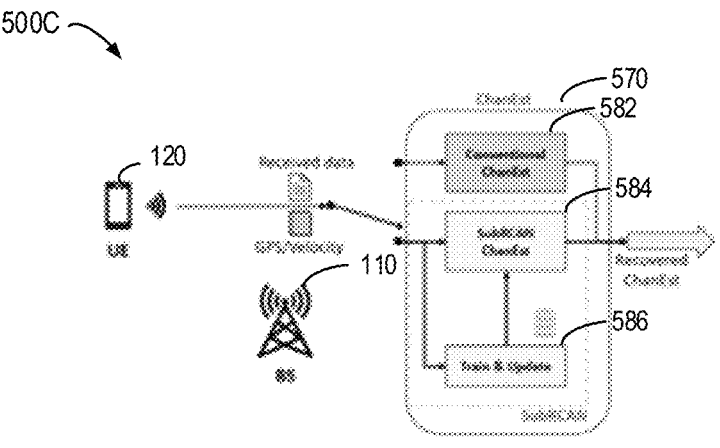
FIG. 5C illustrates an example structure for channel estimation according to some example embodiments of the present disclosure.

FIG. 5C illustrates an example structure for channel estimation 500C according to some example embodiments of the present disclosure. As shown in FIG. 5C, in some embodiments, upon receiving the user data through an air interface and obtaining the information on velocity (e.g., moving speed or information on position) of the second device 120, the first device 110 may perform channel estimation with a channel estimation module 570.

In such embodiments, the first device 110 may determine to perform channel estimation with a conventional estimation module 582 or SubRCAN 583 (e.g., the NN 500A). For example, when the SubRCAN is trained well, the first device 110 may use SubRCAN 583; otherwise, it may fall back to use the conventional estimation module 582. That is, the first device may determine the activation and deactivation of a SubRCAN channel estimation module (i.e., the first channel estimation) 584 accordingly. Once SubRCAN 583 is activated, both raw channel estimation (i.e., the second channel estimation) from reference signal (e.g., DMRS pilots) and information on velocity will be fed to perform the first channel estimation with SubRCAN 583.

In some embodiments, the first device 110 may activate a channel estimation update process (e.g., using a train and update module 586 shown in FIG. 5C). When the update process is activated, defined data (e.g., a data sequence known to both the first device 110 and the second device 120) and information on velocity may be fed to the train and update module 586 to perform model training. After training, SubRCAN will be updated. In the following part, detailed update processes will be introduced with reference to FIGS. 6 and 7.

In the following part, more details examples process of channel estimation will be provided with reference to FIGS. 6-7. It should be appreciated that example embodiments provided with reference to FIGS. 6-7 are provided only for the purpose of illustration, rather than limiting the scope of the present disclosure.

Figure 6:
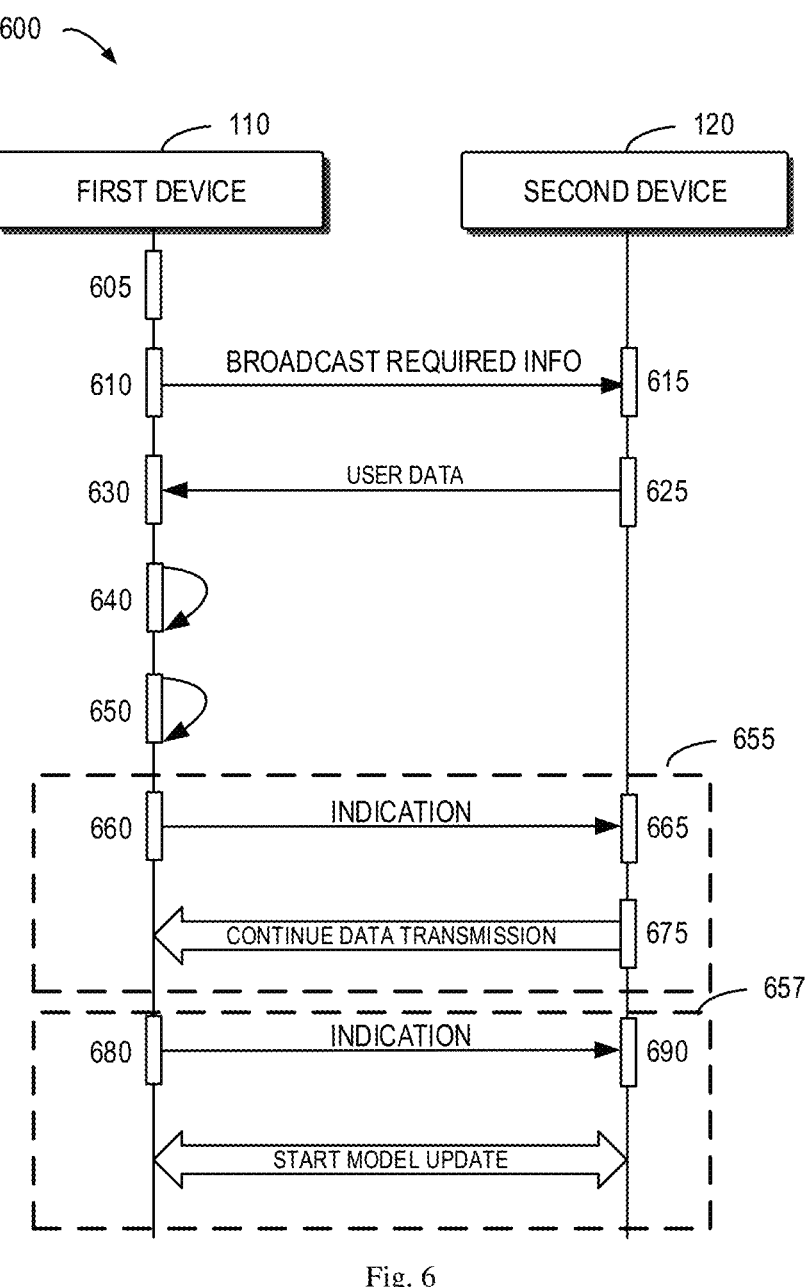
FIG. 6 illustrates a signaling flow for channel estimation according to some example embodiments of the present disclosure.
Figure 7:
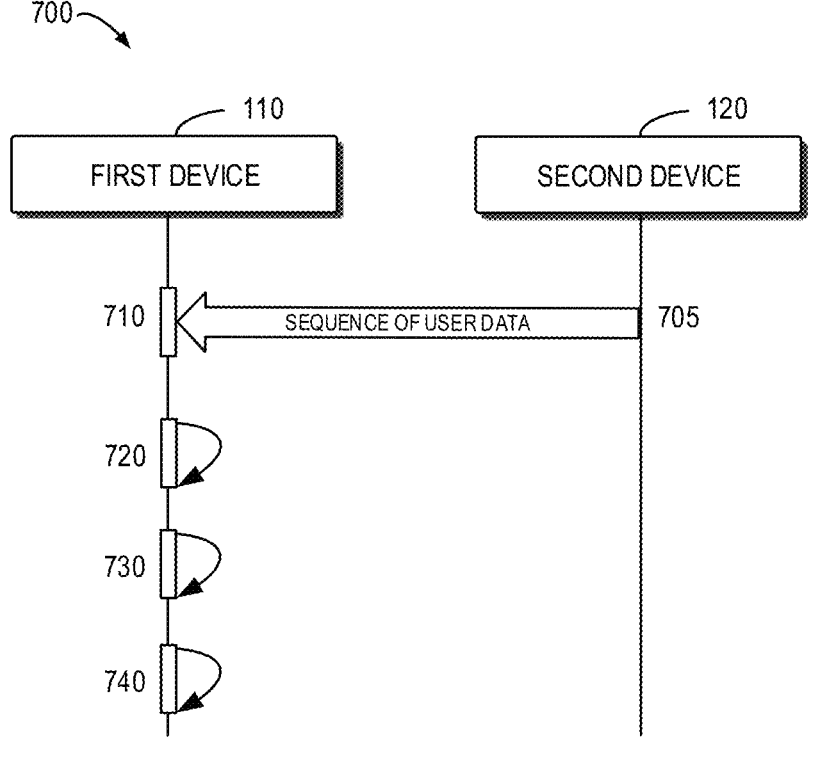
FIG. 7 illustrates a signaling flow for channel estimation according to some example embodiments of the present disclosure.

Reference is now made to FIG. 6, which illustrates a signaling flow 600 for channel estimation according to some example embodiments of the present disclosure. For the purpose of discussion, the signaling flow 600 will be described with reference to FIG. 1. The signaling flow 600 involves the first device 110 and the second device 120 as illustrated in FIG. 1.

As shown in FIG. 6, in some embodiments, the first device 110 may perform initialization for the NN for model training. Considering in some scenarios, even if the information on velocity is explicitly known, an overall effect of phase rotation attributed to the multi-path transmission may be hard to be represented and compensated due to lack of rays' information by receivers conventionally.

Accordingly, for example, the first device 110 may perform 605 initialization with a ray tracing channel for the NN to achieve faster transferring. Accordingly, an overall effect of phase rotation attributed to the multi-path transmission can be better represented and compensated, thus improving the performance of channel estimation. It should be appreciated that the initialization for the NN may also be done with other channel model and the scope of the present disclosure is not limited in this regard.

In some embodiments, during accessing phase (i.e., when the second device 120 is accessing to the second network), the first device 110 may transmit 610, to the second device 120, a message to notify the second device 120 to use a single reference symbol in a slot for user data transmission.

In such embodiments, for example, the message may be sent in a broadcasting way or via a dedicated message. For example, the message may be a system information block (SIB) message which include the information on the notification of the second device 120 to transmit the information on velocity. The message may also be other kinds of existing messages in 3GPP standard or may also be a new message transmitted separately the scope of the present disclosure is not limited in this regard.

In such embodiments, for example, the first device 110 may also notify the second device 120 to transmit the information on the velocity with the same message. However, it should be appreciated that the notice to the second device 120 for transmitting the information on velocity may also be transmitted to the second device 120 with a different message and the protection scope of the present disclosure is not limited in this regard.

In some example embodiments, upon receiving 615 the message, the second device 120 may start transmitting 625 the user data and information on velocity. In such embodiments, the user data may be transmitted continuously. In some example, the information on velocity may be transmitted or reported to the first device 110 with longer periodicity.

In such example, the periodicity for transmitting or reporting the information on velocity may be predetermined. For example, the periodicity may be set with a relatively long time, such that transmission resource may be saved on this aspect.

Alternatively, the periodicity may also be dynamically configured by the first device 110 by transmitting a configuration message to the second device 120.

In some embodiments, accordingly, the first device 110 may receive 630 the user data and performs 640 the first channel estimation with the NN, the process of which may be the same as step 310 and 320 mentioned above. Thus, the details of the steps will not be repeated here.

In some examples, the first device 110 may determine 650 whether the result of the first channel estimation is satisfying. For example, the first device 110 may determine whether the result is satisfying based on a threshold value. In such example, the threshold value may be a predetermined bit error rate (BER) after coding, for example.

Accordingly, for example, when it is determined that the BER is below the threshold value (e.g., 0.002%), the first device 110 may determine that the result of the first channel estimation is satisfying. When it is determined that the BER exceeds or equals to the threshold value, the first device 110 may determine that the result of first channel estimation is not satisfying.

Accordingly, in some examples, the first device 110 may perform actions based on the determination result from step 650, as to be illustrated in FIG. 6 (e.g., blocks 655 and 657 respectively).

In some example embodiments, if it is determined that the result of the first channel estimation is satisfying, as shown in the block 655, the first device 110 may transmit 660, to the second device 120, an indication indicating that the first channel estimation is successful. In response to receiving 665 the indication, the second device 120 may continue transmitting 675 user data to the first device 110 as described in step 625. Accordingly, the first device 110 may receive further user data from the second device 120.

Alternatively, if it is determined that the result of the first channel estimation is not satisfying, as shown in the block 657, the first device 110 may transmit 680, to the second device 120, an indication indicating an activation of an update process for training the NN (e.g., the SubRCAN).

In response to receiving 690 the indication, a process for model update may be performed between the first device 110 and the second device 120. Accordingly, further train may be performed for the NN to update the parameters of the NN, for example. In the following part, the details process for updating the model of the NN will be illustrated with reference to FIG. 7.

Reference is now made to FIG. 7, which illustrates a signaling flow 700 for channel estimation according to some example embodiments of the present disclosure. For the purpose of discussion, the signaling flow 700 will be described with reference to FIG. 1. The signaling flow 700 involves the first device 110 and the second device 120 as illustrated in FIG. 1. It should be appreciated that the signaling flow 700 for updating the NN in FIG. 7 is shown only for the purpose of illustration and the scope of the present disclosure will not be limited in this regard.

As shown in FIG. 7, in some embodiments, upon receiving the indication in step 690 of FIG. 6 mentioned above, the second device 120 may transmit 705 a sequence of user data to the first device 110. The sequence of user data may be predetermined and known to the first device 110 and the second device 120. As such, the sequence of user data may be used for training data collection and be used for training the NN at the first device 110.

In such embodiments, for example, the information on velocity of the second device 120 may also be transmitted to the first device 110 at the same time. Alternatively, the first device 110 may also obtain the information on velocity of the second device 120 from other nodes (such as a positioning platform/server (e.g., GPS)) in the network, and the scope of the present disclosure is not limited in this regard.

In some embodiments, upon receiving 710 the sequence of user data, the first device may perform 720 a training for the NN based on the sequence and the information on velocity of the second device 120. The inputs and outputs data may be as described in FIGS. 5A-5B, the details of which will not be repeated here.

In some embodiments, after completing the training, the first device 110 may update 730 the NN accordingly. Upon updating the NN, the first device 110 may repeat 740 the process in FIG. 7. For example, the second device 120 may continue transmitting user data to the first device 110 as described in step 625, the details of which will not be repeated here.

With the above solution, the NN may be simply updated through train and update module 586 using, for example, the process illustrated with reference to FIG. 7 mentioned above. Moreover, only a small data sets (e.g., a sequence of user data in a few slots) are required in training against the diverse scenarios (e.g., divers-Doppler scenario), thus saving network consumption.

Figure 8A:
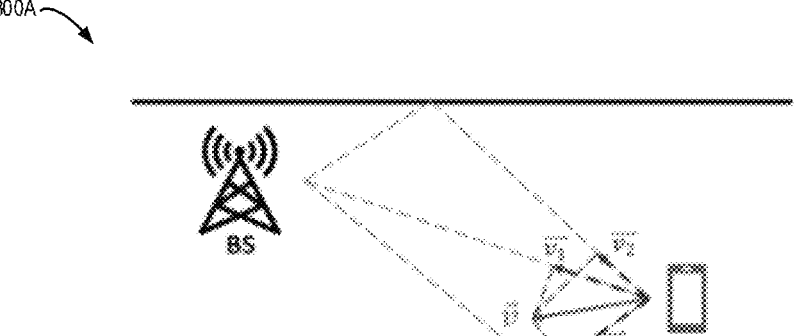
FIG. 8A illustrates directional moving velocity and rays in multi-path according to some embodiments of the present disclosure.

In the following part, some simulation results according to some embodiments of the present disclosure will be illustrated with reference to FIGS. 8A-8B. FIG. 8A illustrates directional moving velocity and rays in multi-path 800 according to some embodiments of the present disclosure. To evaluate the performance of the proposed solution, simulation is performed in diverse Doppler scenarios in ray tracing.

The channel model in generating the training is a ray tracing model from the simulation software MATLAB. The diversity of high Doppler is represented by the 7 sets of diverse data collected when the second device 120 is moving at the speeds of $$[0, 0, 0], \left[30 \cos\left(\frac{\pi}{4}\right), 30 \sin\left(\frac{\pi}{4}\right), 0\right], \left[30\cos\left(\frac{5\pi}{4}\right), 30 \sin\left(\frac{5\pi}{4}\right),\right.$$

$$\left.0, \left[120 \cos\left(\frac{\pi}{4}\right), 120 \sin\left(\frac{\pi}{4}\right), 0\right], \left[120 \cos\left(\frac{5\pi}{4}\right), 120 \sin\left(\frac{5\pi}{4}\right), 0\right],\right.$$

$$\left[300 \cos\left(\frac{\pi}{4}\right), 300\sin\left(\frac{\pi}{4}\right), 0\right], \left[300 \cos\left(\frac{5\pi}{4}\right), 300 \sin\left(\frac{5\pi}{4}\right), 0\right] \text{ km/h},$$

respectively, where the angles represent the moving directions of second device 120 in simulation.

The Doppler is applied by projecting from the second device 120 moving direction to each coming ray separately as shown in FIG. 8A. The signal to noise ratio (SNR) ranges from 0 dB to 20 dB with an interval of 2 dB. 1000 samples are collected under each condition for training. The NN is validated with another new data sets with the same condition described above.

Figure 8B:
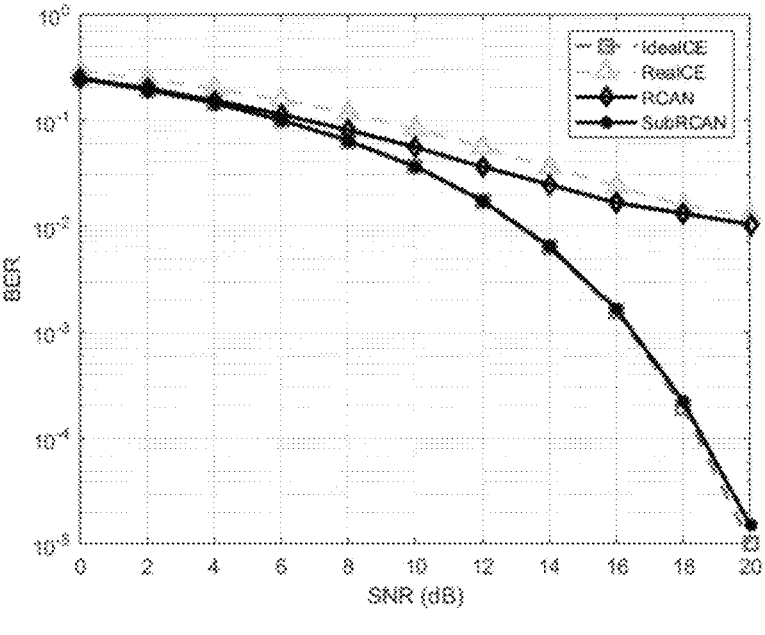
FIGS. 8B-8C illustrates performance of an NN against Doppler according to some embodiments of the present disclosure.
Figure 8C:
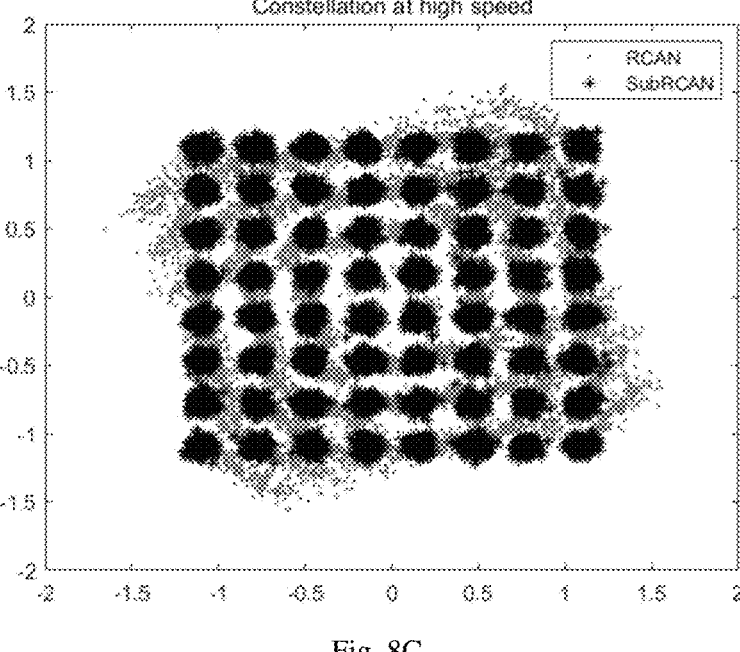

FIGS. 8B-8C illustrate performance of an NN against Doppler according to some embodiments of the present disclosure. FIG. 8B is averaged bit error rate (BER) curves after decoding. The dash curve with squares shows the BER from perfect channel estimation with known channel. The dash curve with triangles is obtained with conventional real channel estimation where a linear interpolation performed. The solid curve with diamonds shows the performance of RCAN without SubNN, while the solid curve with dots shows the performance of SubRCAN. As can be seen from 800B, SubRCAN outperforms RCAN only and conventional real channel estimation and approximates the perfect channel estimation.

FIG. 8C shows the constellation diagram of RCAN (results of which shown with dots) and SubRCAN (results of which shown with stars) respectively. It can be seen that rotation still exists in RCAN channel estimation in high-Doppler scenario. With information on velocity-assisted SubNN, the rotation is well corrected by SubRCAN. The results show that SubRCAN owns strong ability to handle high-Doppler scenarios.

FIG. 9 illustrates a flowchart of a method 900 implemented at the first device 110 according to some embodiments of the present disclosure. It is to be understood that the method 900 may include additional blocks not shown and/or may omit some blocks as shown, and the scope of the present disclosure is not limited in this regard. For the purpose of discussion, the method 900 will be described from the perspective of the first device 110 with reference to FIG. 1.

At block 910, the first device receives user data in a slot from a second device via a channel between the first device and the second device, the user data comprising a reference symbol (e.g., a DMRS). At block 920, the first device then performs, with a NN, a first channel estimation for the channel based on information on velocity of a second device and a result of a second channel estimation for the channel. The second channel estimation is performed based on the received reference symbol. After that, at block 930, the first device transmits, to the second device, an indication of a result of the first channel estimation.

In some embodiments, the NN may comprise a super resolution NN, SRNN, and a further NN, the result of the second channel estimation is inputted to the SRNN, and the information on velocity is inputted to the further NN.

In some embodiments, the information on velocity may comprise at least one of the following: a moving speed of the second device, and information on position of the second device.

In some embodiments, the first device may transmit the indication by: in accordance with a determination that the result of the first channel estimation is satisfying, transmitting, to the second device, the indication indicating that the first channel estimation is successful, and the first device may further to receive further user data from the second device.

In some embodiments, the first device may transmit the indication by: in accordance with a determination that the result of the first channel estimation is un-satisfying, transmitting, to the second device, the indication indicating an activation of an update process for training the NN; and the first device may further receive a sequence of user data from the second device, the sequence of user data being predetermined and known to the first device and the second device; perform a training for the NN based on a further information on velocity of the second device and the sequence; and update the NN upon a completion of the training.

In some embodiments, the first device may further transmit, to the second device, a message to notify the second device to use one reference symbol in a slot for user data transmission.

In some embodiments, the first device may further transmit, to the second device, a message to notify the second device to transmit the information on the velocity; and receive the information on velocity from the second device.

In some embodiments, the NN may be initialized with a ray-tracing based channel.

FIG. 10 illustrates a flowchart of a method 1000 implemented at a second device 120 according to some embodiments of the present disclosure. It is to be understood that the method 900 may include additional blocks not shown and/or may omit some blocks as shown, and the scope of the present disclosure is not limited in this regard. For the purpose of discussion, the method 1000 will be described from the perspective of the second device 120 with reference to FIG. 1.

At block 1010, the second device 120 transmits user data in a slot to a first device via a channel between the first device and the second device. The user data comprise a reference symbol, such that the first device performs, with a NN, a first channel estimation for the channel based on information on velocity of the second device and a result of a second channel estimation for the channel. The second channel estimation is performed based on the received reference symbol. At block 1020, the second device 120 then receives, from the first device, an indication of a result of the first channel estimation.

In some embodiments, the information on velocity may comprise at least one of the following: a moving speed of the second device, and information on position of the second device.

In some embodiments, the indication may indicate that the first channel estimation is successful, and the second device may further in response to receiving the indication, transmit further user data to the first device.

In some embodiments, the indication may indicate an activation of an update process for training the NN. The second device may further in response to receiving the indication, transmit a sequence of user data to the first device, the sequence of user data being predetermined and known to the first device and the second device.

In some embodiments, the second device may further receive, from the first device, a message to notify the second device to use one reference symbol in a slot for user data transmission.

In some embodiments, the second device may receive, from the first device, a message to notify the second device to transmit the information on the velocity; and in response to receiving the message, transmit the information on velocity to the first device.

In some embodiments, the NN may be initialized with a ray-tracing based channel.

In some embodiments, the first apparatus capable of performing any of the method 900 (for example, the first device 110) may comprise means for performing the respective steps of the method 900. The means may be implemented in any suitable form. For example, the means may be implemented in a circuitry or software module.

In some example embodiments, the first apparatus comprises: means for receiving, from a second apparatus, user data in a slot from a second apparatus via a channel between the first apparatus and the second apparatus, the user data comprising a reference symbol; means for performing, with a NN, a first channel estimation for the channel based on information on velocity of a second apparatus and a result of a second channel estimation for the channel, the second channel estimation being performed based on the received reference symbol; and means for transmitting, to the second apparatus, an indication of a result of the first channel estimation.

In some example embodiments, the NN comprises a super resolution NN, SRNN, and a further NN, the result of the second channel estimation is inputted to the SRNN, and the information on velocity is inputted to the further NN.

In some example embodiments, the information on velocity comprises at least one of the following: a moving speed of the second apparatus, and information on position of the second apparatus.

In some example embodiments, means for transmitting the indication includes means for in accordance with a determination that the result of the first channel estimation is satisfying, transmitting, to the second apparatus, the indication indicating that the first channel estimation is successful, and the first apparatus further comprises means for receiving further user data from the second apparatus.

In some example embodiments, means for transmitting the indication comprises means for in accordance with a determination that the result of the first channel estimation is un-satisfying, means for transmitting, to the second apparatus, the indication indicating an activation of an update process for training the NN; and the first apparatus further comprises means for receiving a sequence of user data from the second apparatus, the sequence of user data being predetermined and known to the first apparatus and the second apparatus; means for perform a training for the NN based on a further information on velocity of the second apparatus and the sequence; and means for update the NN upon a completion of the training.

In some example embodiments, the first apparatus further comprises means for transmitting, to the second apparatus, a message to notify the second apparatus to use one reference symbol in a slot for user data transmission.

In some example embodiments, the first apparatus further comprises means for transmitting, to the second apparatus, a message to notify the second apparatus to transmit the information on the velocity; and means for receive the information on velocity from the second apparatus.

In some example embodiments, the NN is initialized with a ray-tracing based channel.

In some embodiments, the second apparatus capable of performing any of the method 1000 (for example, the second device 120) may comprise means for performing the respective steps of the method 1000. The means may be implemented in any suitable form. For example, the means may be implemented in a circuitry or software module.

In some embodiments, the second apparatus comprises: means for transmitting user data in a slot to a first apparatus via a channel between the first apparatus and the second apparatus, the user data comprising a reference symbol, such that the first apparatus performs, with a NN, a first channel estimation for the channel based on information on velocity of the second apparatus and a result of a second channel estimation for the channel, the second channel estimation being performed based on the received reference symbol; and means for receive, from the first apparatus, an indication of a result of the first channel estimation.

In some example embodiments, the information on velocity may comprise at least one of the following: a moving speed of the second apparatus, and information on position of the second apparatus.

In some example embodiments, the indication may indicate that the first channel estimation is successful, and the second apparatus further includes means for in response to receiving the indication, transmitting further user data to the first apparatus.

In some example embodiments, the indication may indicate an activation of an update process for training the NN, and the second apparatus may further include means for in response to receiving the indication, transmitting a sequence of user data to the first apparatus, the sequence of user data is predetermined and known to the first apparatus and the second apparatus.

In some example embodiments, the second apparatus may further comprise means for receiving, from the first apparatus, a message to notify the second apparatus to use one reference symbol in a slot for user data transmission.

In some example embodiments, the second apparatus may further comprise means for receiving, from the first apparatus, a message to notify the second apparatus to transmit the information on the velocity; and means for in response to receiving the message, transmit the information on velocity to the first apparatus.

In some example embodiments, the NN may be initialized with a ray-tracing based channel.

Figure 11:
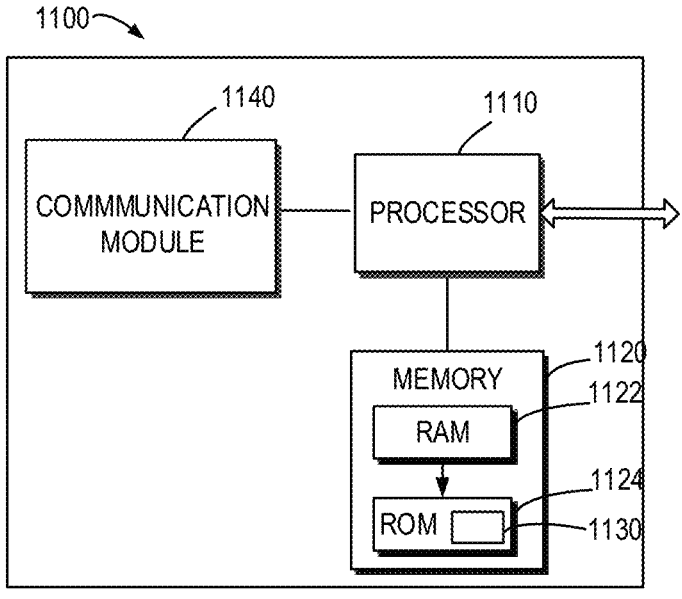
FIG. 11 illustrates a simplified block diagram of a device that is suitable for implementing example embodiments of the present disclosure.
Figure 12:
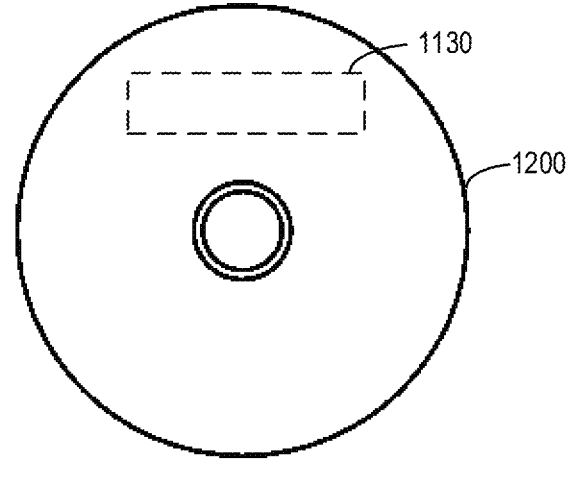
FIG. 12 illustrates a block diagram of an example computer readable medium according to some embodiments of the present disclosure.

FIG. 11 is a simplified block diagram of a device 1100 that is suitable for implementing embodiments of the present disclosure. The device 1100 may be provided to implement the communication device, for example the first device 110, the second device 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random-access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIGS. 2 to 10. The embodiments of the present disclosure may also be implemented by hardware or by a combination of software and hardware.

In some embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 10 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 900-1000 as described above with reference to FIGS. 2-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one memory including computer program code;
the at least one memory and the computer program code are configured to, with the at least one processor, cause the first device to:
receive user data in a slot from a second device via a channel between the first device and the second device, the user data comprising a reference symbol;
perform, with a neural network, a first channel estimation for the channel based on information on velocity of a second device and a result of a second channel estimation for the channel, the second channel estimation being performed based on the received reference symbol; and
transmit, to the second device, an indication of a result of the first channel estimation, the indication indicating that the first channel estimation is successful in accordance with a determination that the result of first channel estimation is satisfying or indicating an activation of an update process for training the neural network in accordance with a determination that the result of the first channel estimation is unsatisfying.

2. The first device of claim 1, wherein the neural network comprises a super resolution neural network, SRNN, and a further neural network, the result of the second channel estimation is inputted to the SRNN, and the information on velocity is inputted to the further neural network.

3. The first device of claim 1, wherein the information on velocity comprises at least one of the following:
a moving speed of the second device, and
information on position of the second device.

4. The first device of claim 1, wherein the at least one memory and the computer program code are configured to, with the at least one processor, cause the first device to transmit the indication by:
in accordance with a determination that the result of the first channel estimation is satisfying, transmitting, to the second device, the indication indicating that the first channel estimation is successful, and
wherein the at least one memory and the computer program code are configured to, with the at least one processor, further cause the first device to:
receive further user data from the second device.

5. The first device of claim 1, wherein the at least one memory and the computer program code are configured to, with the at least one processor, cause the first device to transmit the indication by:
in accordance with a determination that the result of the first channel estimation is un-satisfying, transmitting, to the second device, the indication indicating an activation of an update process for training the neural network;
wherein the at least one memory and the computer program code are configured to, with the at least one processor, further cause the first device to:
receive a sequence of user data from the second device, the sequence of user data being predetermined and known to the first device and the second device;
perform a training for the neural network based on a further information on velocity of the second device and the sequence; and
update the neural network upon a completion of the training.

6. The first device of claim 1, wherein the at least one memory and the computer program code are configured to, with the at least one processor, further cause the first device to:
transmit, to the second device, a message to notify the second device to use one reference symbol in a slot for user data transmission.

7. The first device of claim 1, wherein the at least one memory and the computer program code are configured to, with the at least one processor, further cause the first device to:
transmit, to the second device, a message to notify the second device to transmit the information on the velocity; and
receive the information on velocity from the second device.

8. The first device of claim 1, wherein the neural network is initialized with a ray-tracing based channel.

9. A second device, comprising:
at least one processor; and
at least one memory including computer program code;
the at least one memory and the computer program code are configured to, with the at least one processor, cause the second device to:
transmit user data in a slot to a first device via a channel between the first device and the second device, the user data comprising a reference symbol, such that the first device performs, with a neural network, a first channel estimation for the channel based on information on velocity of the second device and a result of a second channel estimation for the channel, the second channel estimation being performed based on the received reference symbol; and receive, from the first device, an indication of a result of the first channel estimation, the indication indicating that the first channel estimation is successful or indicating an activation of an update process for training the neural network.

10. The second device of claim 9, wherein the information on velocity comprises at least one of the following:

a moving speed of the second device, and information on position of the second device.

11. The second device of claim 9, wherein the indication indicating that the first channel estimation is successful, and wherein the at least one memory and the computer program code are configured to, with the at least one processor, further cause the second device to:

in response to receiving the indication, transmit further user data to the first device.

12. The second device of claim 9, wherein the indication indicating an activation of an update process for training the neural network, and wherein the at least one memory and the computer program code are configured to, with the at least one processor, further cause the second device to:

in response to receiving the indication, transmit a sequence of user data to the first device, the sequence of user data being predetermined and known to the first device and the second device.

13. The second device of claim 9, wherein the at least one memory and the computer program code are configured to, with the at least one processor, further cause the second device to:

receive, from the first device, a message to notify the second device to use one reference symbol in a slot for user data transmission.

14. The second device of claim 9, wherein the at least one memory and the computer program code are configured to, with the at least one processor, further cause the second device to:

receive, from the first device, a message to notify the second device to transmit the information on the velocity; and in response to receiving the message, transmit the information on velocity to the first device.

15. The second device of claim 9, wherein the neural network is initialized with a ray-tracing based channel.

16. A method comprising:

receiving, at a first device from a second device, user data in a slot from a second device via a channel between the first device and the second device, the user data comprising a reference symbol;

performing, with a neural network, a first channel estimation for the channel based on information on velocity of a second device and a result of a second channel estimation for the channel, the second channel estimation being performed based on the received reference symbol; and transmitting, to the second device, an indication of a result of the first channel estimation, the indication indicating that the first channel estimation is successful in accordance with a determination that the result of first channel estimation is satisfying or indicating an activation of an update process for training the neural network in accordance with a determination that the result of the first channel estimation is unsatisfying.

17. A method comprising:

transmitting, at a second device to a first device, user data in a slot to a first device via a channel between the first device and the second device, the user data comprising a reference symbol, such that the first device performs, with a neural network, a first channel estimation for the channel based on information on velocity of the second device and a result of a second channel estimation for the channel, the second channel estimation being performed based on the received reference symbol; and receiving, from the first device, an indication of a result of the first channel estimation, the indication indicating that the first channel estimation is successful or indicating an activation of an update process for training the neural network.

18. A non-transitory computer readable medium comprising instructions that, when executed by a processor, cause a first apparatus to perform at least the following:

receiving, from a second apparatus, user data in a slot from a second apparatus via a channel between the first apparatus and the second apparatus, the user data comprising a reference symbol;

performing, with a neural network, a first channel estimation for the channel based on information on velocity of a second apparatus and a result of a second channel estimation for the channel, the second channel estimation being performed based on the received reference symbol; and transmitting, to the second apparatus, an indication of a result of the first channel estimation, the indication indicating that the first channel estimation is successful in accordance with a determination that the result of first channel estimation is satisfying or indicating an activation of an update process for training the neural network in accordance with a determination that the result of the first channel estimation is unsatisfying.

19. A non-transitory computer readable medium comprising instructions that, when executed by a processor, cause a second apparatus to perform at least the following:

transmitting, to a first apparatus, user data in a slot to a first apparatus via a channel between the first apparatus and the second apparatus, the user data comprising a reference symbol, such that the first apparatus performs, with a neural network, a first channel estimation for the channel based on information on velocity of the second apparatus and a result of a second channel estimation for the channel, the second channel estimation being performed based on the received reference symbol; and receiving, from the first apparatus, an indication of a result of the first channel estimation, the indication indicating that the first channel estimation is successful or indicating an activation of an update process for training the neural network.

* * * * *